United States Patent [19]

Rusyniak

[11] Patent Number: 4,618,896
[45] Date of Patent: Oct. 21, 1986

[54] SINGLE MESSAGE RECORDER AND PLAYBACK APPARATUS

[76] Inventor: Michael F. Rusyniak, 9 Donald Pl., Liverpool, N.Y. 13088

[21] Appl. No.: 722,686

[22] Filed: Apr. 12, 1985

[51] Int. Cl.[4] ............... G11B 5/00; G11B 5/02; G11B 25/04
[52] U.S. Cl. .................................. 360/1; 360/2; 360/137
[58] Field of Search ............... 360/1, 2, 137; 235/61 A

[56] References Cited

U.S. PATENT DOCUMENTS

| | | | |
|---|---|---|---|
| 3,852,817 | 12/1974 | Budrose | 360/2 X |
| 3,876,297 | 4/1975 | Appledorn et al. | 353/19 |
| 4,126,885 | 11/1978 | Murata | 360/2 |
| 4,139,875 | 2/1979 | Tatara et al. | 360/2 X |

*Primary Examiner*—Terrell W. Fears
*Assistant Examiner*—Alyssa H. Bowler
*Attorney, Agent, or Firm*—Bruns and Wall

[57] ABSTRACT

A single message recording and readout device that employs a rigid elongated stick having at least one flat surface thereon containing a magnetic recording tape for recording and playing back short messages. A guideway for slidably receiving said stick passes through a housing containing a drive unit and appropriate electrical recording and playback circuitry. The drive unit includes a pair of pinch rollers that are mounted within the passage of the guideway for driving the stick along a linear path of travel past a magnetic head. A switch, which is operatively connected to the drive unit, and the recording and playback circuitry is positioned at the entrance to the passage which activates the drive unit as the leading edge of the stick passes through the entrance region and which further deactivates the drive unit when the trailing edge of the stick clears the entrance region. A function switch is further provided for manually selecting a desired mode of operation so that when the stick passes the magnetic head a message is either placed thereon or, alternatively, a message previously recorded is read out.

18 Claims, 5 Drawing Figures

U.S. Patent   Oct. 21, 1986   Sheet 1 of 2   4,618,896
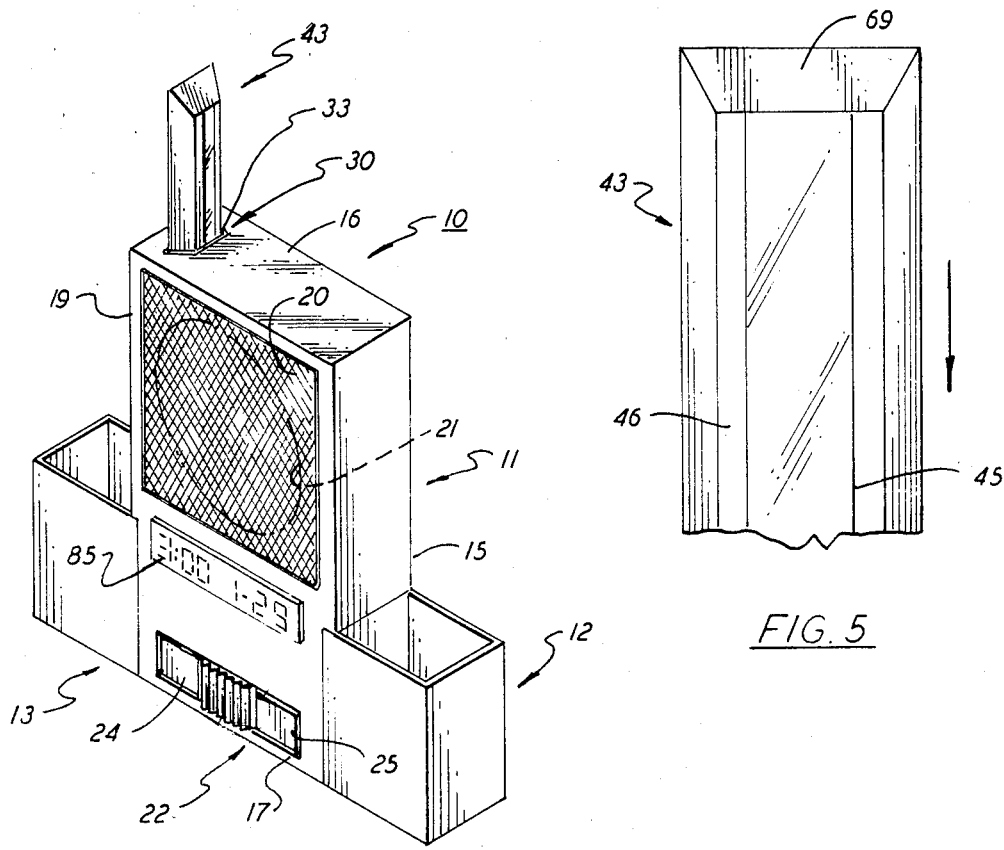
FIG. 1
FIG. 5
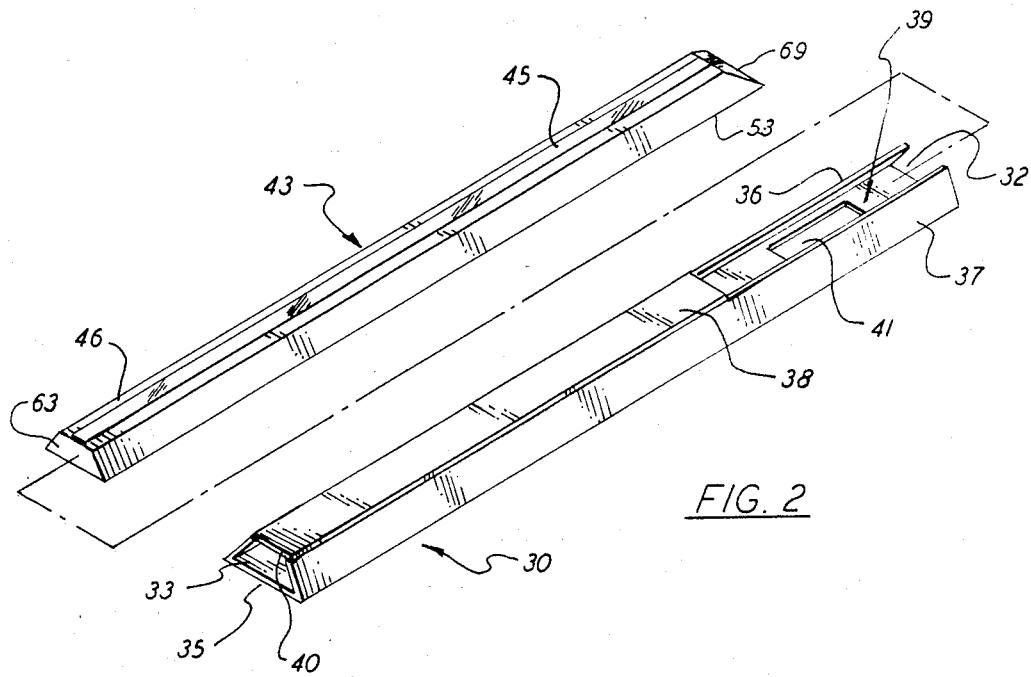
FIG. 2

SINGLE MESSAGE RECORDER AND PLAYBACK APPARATUS

BACKGROUND OF THE INVENTION

This invention relates to a combination recorder and transcriber that is specifically adapted for use in recording and playing back short messages.

Many types of tape recorders are in common use today around offices and homes which utilize tape cassettes or cartridges of the type disclosed in U.S. Pat. No. 3,642,228. These cassettes usually involve a pair of spools that coact to transfer a long continuous length of magnetic tape past a magnetic recording and readout head. Usually the tape is adapted to record on two channels, one of which is utilized as the spools turn in a first direction and the other of which is utilized as the spools turn in the opposite direction. Each channel is usually capable of storing about thirty minutes of audio information. Use of this equipment therefore to record short messages is not generally practical or economically feasible. Short messages generally tend to be lost on the comparatively long tapes and oftentimes the short messages are difficult to find and play back. In the event a large number of short messages are generated by different people within a single organization, an equal number of cartridges or cassettes will be needed to store these messages. As can be seen, in a short period of time, a relatively large number of cassettes might be tied up in conveying short messages which of course is a total underutilization of the tapes.

U.S. Pat. Nos. 4,237,624 to Yeh and 3,488,867 to Lyons et al both describe devices for handling flexible cards upon which a strip of recording tape has been glued or otherwise affixed. The cards are used as teaching aids and typically contain visual material printed thereon depicting subject matter directly relating to the audio message. The flexible cards, however, make extremely poor supports for the recording media. The cards tend to bend as they are transported through the recording or playback zone thereby seriously degrading the audio information. By the same token, it is difficult to move the cards at a uniform speed past the magnetic recording head and, as a consequence, the messages are distorted. Lyons et al, recognizing this problem, utilizes a system whereby the card is held stationary and the head is moved past the tape. The moving head system, however, is difficult to implement and raises the price of the equipment dramatically. Flexible cards of this nature also can become damaged through usage unless they are carefully handled and stored.

SUMMARY OF THE INVENTION

It is therefore a primary object of the present invention to improve apparatus for recording and playing back short messages.

It is a further object of the present invention to provide apparatus for recording and playing back short messages in which the recording tape is mounted upon a rigid support that can be repeatedly handled without damaging the tape.

It is a still further object of the present invention to provide an inexpensive recording device capable of recording and playing back short messages.

It is another object of the present invention to provide a short message tape recorder that can rapidly and automatically process short runs of tape without distorting the audio message.

These and other objects of the present invention are attained by means of recording and playback apparatus that include a housing having a linear guideway passing therethrough. The housing further contains a combination speaker and microphone unit that is coupled to an audio section and positioned adjacent to the guideway. A rigid elongated stick is slidably received within the guideway having a strip of magnetic tape disposed along its planar surface. A drive unit mounted in the guideway engages the stick and transports it past the recording and playback head at a uniform desired speed. A switch is positioned at the entrance to the guideway which automatically turns on the drive means when the leading edge of the stick passes into the guideway and then automatically deactivates the drive means when the trailing edge of the stick passes through the entrance. A pair of pressure activated switches are provided whereby either a pause or record mode of operation can be manually selected. The apparatus is normally in a playback mode of operation.

BRIEF DESCRIPTION OF THE DRAWINGS

For a better understanding of these and other objects of the present invention reference is had to the following description of the invention which is to be read in conjunction with the associated drawings, wherein:

FIG. 1 is a perspective view of a wall mounted recorder and transcriber unit embodying the teachings of the present invention;

FIG. 2 is an enlarged perspective view of a guideway and a recording stick utilized in the unit shown in FIG. 1;

FIG. 5 is a partial top view of the recording stick utilized in the practice of the present invention.

DESCRIPTION OF THE INVENTION

Figure 3:
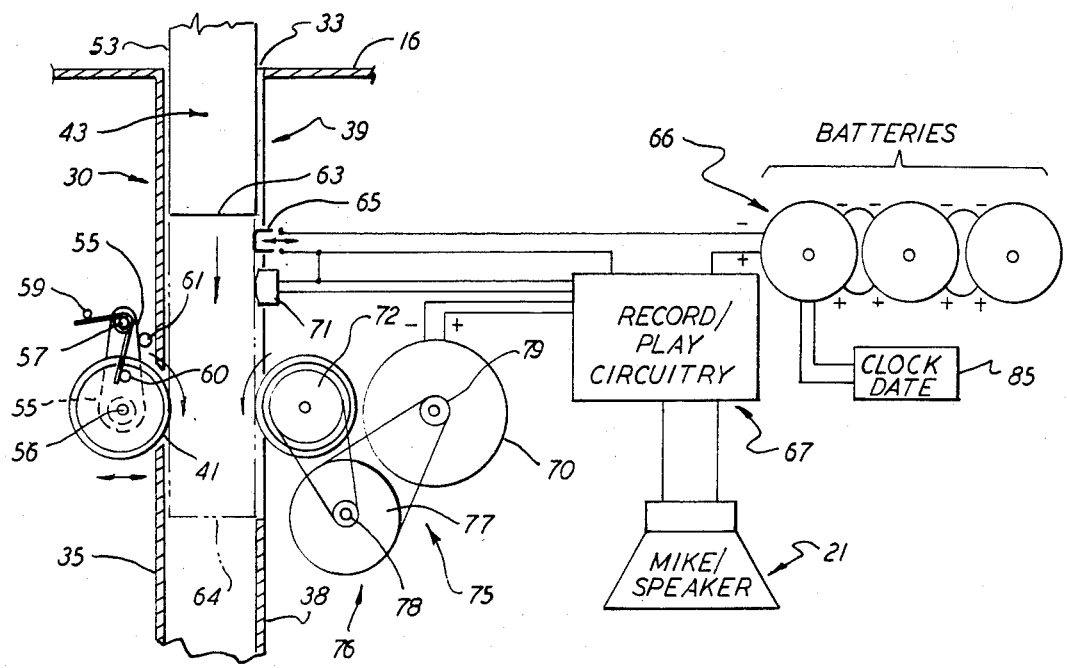
FIG. 3 is an enlarged partial plan view showing the audio section and drive system utilized in the present invention.

Referring initially to FIG. 1, there is shown a wall mounted unit, generally referenced 10, that embodies the teachings of the present invention. The unit includes a main housing 11 and two small bins 12 and 13 mounted upon opposing side walls of the housing. Although not shown, a hanger is secured to the rear panel 15 of the housing by which the device can be affixed to the vertical side wall of a room, bookshelf or the like, to provide free access to the top surface 16 and bottom surface 17 of the housing. The front panel 19 of the housing further contains a screen 20 behind which is flush mounted a combination microphone and speaker assembly 21 of a suitable design. Also included on the front panel of the housing are two pressure actuated switches 24 and 25. Switch 24 is a pause switch which, when held depressed, deactivates the system drive switch 25 is a record switch which, as will be explained below, permits a message of short duration to be recorded. A digital display window 26 is also mounted upon the front panel of the housing as shown in FIG. 1. The window contains a first liquid crystal readout 28 depicting time and a second similar readout 29 depicting the date.

The housing further contains a guideway 30 having a trapezoidal shaped passage that extends vertically through the housing between the top wall 16 and the bottom wall 17 thereof (FIGS. 2 and 3). The guideway provides a clear uninterrupted path of travel through the housing. The guideway further contains an upper entrance 32 that opens through the top wall 16 of the housing and a lower exit 33 that similarly opens through the bottom wall 17 thereof. As best illustrated in FIG. 2, the guideway includes a back planar wall 35 and two inclined side walls 36 and 37 that slant inwardly towards a foreshortened top planar wall 38. The bottom edge 40 of top planar wall 38 is positioned flush with the lower exit 33 of the guideway and extends upwardly to partially enclose about two-thirds of the guideway. A generous front opening 39 is thus furnished at the top front section of the guideway which allows access to the interior of the guideway passage. A laterally disposed slotted hole 41 is also formed in the back planar wall of the guideway immediately opposite the front opening 39.

A trapezoidal shaped stick, generally referenced 43, is capable of being slidably received within the guideway passage. The cross-sectional configuration of the stick complements that of the passage formed in the guideway so that the outer surfaces of the stick provide a close running fit with the interior surfaces of the passage. A linear strip of magnetic recording tape 45 (FIG. 5) is securely mounted upon the top planar surface 46 of the stick by any suitable means. The length of the stick is equal to or slightly greater than the length of the passage formed in the guideway. In this embodiment of the invention, the magnetic tape contains a single channel capable of recording about 20 seconds of audio information, however, multi-channel tapes can be similarly employed without departing from the teachings of the invention.

The stick 43 is an elongated rigid member that is capable of moving freely into the entrance 32 of the guideway passage as shown in FIG. 1. Once inserted in the passage, the stick is directed along a linear path of travel as it passes through the housing. The stick is preferably made of plastic or wood or any other suitable material that will not adversely affect the magnetic recording and playback equipment. Because of its shape, the stick can only be inserted into the passageway of the guide with the tape bearing top surface 46 thereof facing the opening 39 formed at the upper end of the passageway. The stick is rigid enough in construction so that it will not bend or flex as it moves through the passageway.

Figure 4:
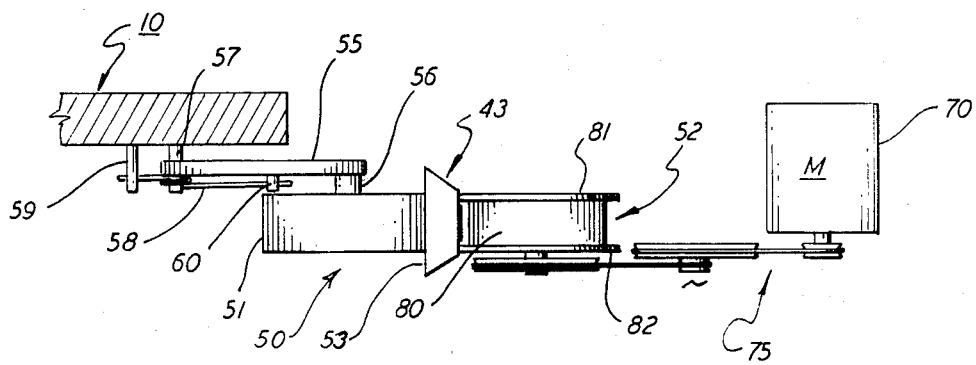
FIG. 4 is a section taken along lines 4—4 in FIG. 3 further illustrating the present drive system.

Turning now more specifically to FIGS. 3 and 4, the upper part of the passage entrance 33 is shown in greater detail. A stick 43 is further shown passing downwardly through the entranceway toward a pair of coacting pinch rollers 51 and 52 (FIG. 4) which form part of drive mechanism 50. The drive mechanism includes a biased backup roller 51 that is situated in the slotted hole 41 formed in back wall 35 of the guide and a bifurcated drive roller 52 situated in the opening 39 found in the upper front section of the guide. The rollers act in concert to engage the top surface 46 and the bottom surface 53 of the stick in friction driving contact as the stick passes between the rollers. The drive roller 52 is stationarily mounted within opening 39 while the backup roller is movably mounted upon a rocker arm 55 so that it can move towards and away from the drive roller within the slotted hole 41.

The rocker arm rotatably supports the backup roller 51 in the lower end thereof by means of a stub shaft 56 and a suitable bearing means (not shown). The upper end of the arm is pivotally supported within the housing by means of a pivot pin 57. A biasing spring 58 is wound about pivot pin 57 and is loaded between a first anchor pin 59 staked to the housing and a second anchor pin 60 staked to the rocker arm. The spring is mounted in a loaded condition so as to urge the arm about pivot pin 57 into arresting contact against a stop 61. The spring strength is soft enough to allow the roller 51 to be moved back from the arresting stop by the passage of a stick through the nip of the pinch rollers. The spring strength, however, is strong enough to securely hold the stick in the nip and permit the stick to be driven forward via friction as drive roller 52 is turned in the direction indicated.

The leading edge 69 of the stick is passed into the passage of the guide through the entrance 33. Initially the stick is inserted to a depth whereby the leading edge is passed through the nip of the pinch rollers. This initial position is depicted in phantom outline at 64 in FIG. 3. As the leading edge of the stick, however, passes downwardly through the guide entrance region, it first comes into contact with a normally opened electrical contact 65. The stick serves to manually close the contact and thus allows current to flow between a power supply 66, which in this case is a battery pack, and a recording and playback unit shown diagramatically at 67. The function switches shown on the front panel of the housing in FIG. 1 are also electrically coupled to the recording and playback unit 67. In practice the record and playback unit is normally in a playback mode of operation so that upon insertion of a stick, the stick will be automatically carried past a magnetic head 71 to play back any messages recorded upon tape 45. Depressing switch 24 will momentarily interrupt this normal cycle by stopping the drive motor. In the event a message is to be recorded, switch 25 is depressed whereupon the user dictates the message into the microphone speaker 21 and it is recorded upon the tape via head 71. The magnetic recording and playback head 71 (FIG. 3) is also mounted within the opening 39 downstream from contact 65. The head is positioned so that it comes into operative sliding contact with the magnetic tape secured to the top surface of the stick whereby audio data is recorded upon the tape or played back from the tape depending upon the operational mode in use.

With the stick positioned in the nip of the pinch rollers, and the motor actuated, the stick and the magnetic tape secured thereon are driven by the pinch rollers past the magnetic head 71. As best illustrated in FIG. 4, the motor 70 is connected to the drive roller 52 by means of a step-down pulley system generally referenced 75. The motor is coupled to the drive roller by means of a two-stage intermediate idler pulley 76 containing a large wheel 77 connected directly to a small motor mounted pulley 79 and a smaller wheel 78 connected to a larger drive roller pulley 72 via appropriate belts. The pulley system acts to step down the motor speed so that the drive roller 52 moves the stick at a uniform rate that is compatible with the recording and playback speed of unit 67 whereby the audio signal will not be distorted.

The length of the stick between its leading edge 69 and its trailing edge 63 is greater than the length of the guideway passage. The stick, in operation, will be driven by the rollers until such time as the trailing edge thereof passes the contact 65. At the time the power lines to the record and play circuitry 67 and the drive motor 70 are opened thus automatically deactivating the drive. The stick, however, at shut down has not entirely cleared the nip of the pinch rollers and the stick remains captured between the rollers. The front end of the stick, at shut down, is, however, protruding through the bottom exit of the passage so that it can be grasped and manually pulled free of the passage. As can be seen, the stick is thus prevented from falling out of the unit when it is automatically shut down.

The drive roller 52 is made up of a center drum 80 having two outer discs 81 and 82 concentrically secured to the opposing end faces thereof. The diameter of each disc is greater than that of the drum whereby only the outer periphery of the discs contact the top surface of a stick passing through the guide. The axial distance between the two outer discs is greater than the width of the linear magnetic recording tape secured upon the stick. In practice, the discs span the tape and ride on the top surface 46 of the stick on either side thereof. Accordingly, the tape itself is not contacted by any part of the drive roller and is thus prevented from being damaged by the roller. The two discs, as well as the outer periphery of the backup roller, are fabricated of a material that has a relatively high coefficient of friction to prevent the stick from slipping as it passes through the rollers.

A combined clock and calendar chip 85 is wired directly to the power supply and provides a digital readout at the display window shown in FIG. 1. A combination microphone and speaker is also wired directly to the recording and transcribing unit 67. As also shown in FIG. 1, the microphone-speaker combination is conveniently positioned in the front panel 19 of the housing thus furnishing access to the user. The bins 12 and 13 positioned on either side of the housing can be used to store message sticks. Those sticks bearing recorded messages can be located on one side of the bin and those ready for recording can be left on the other side.

While this invention has been disclosed with specific reference to the detailed description set forth above, it is not confined to this specific structure and this application is intended to cover any modifications and changes that may come within the scope of the following claims.

What is claimed:

1. A single message recording and playback apparatus that includes
    a rigid elongated stick having at least one flat surface thereon,
    a magnetic recording tape disposed along the flat surface of the stick for recording a message,
    a guideway having a passage for slidably receiving said stick therein and directing the stick along a linear path of travel,
    a drive means located along the guideway for engaging the stick and moving it along said linear path of travel,
    a switch means operatively connected to said drive means, said switch positioned at the entrance to the guideway passage to automatically activate the drive means as the leading edge of the stick passes the entrance, and to automatically deactivate the drive means as the trailing edge of the stick passes through the entrance,
    a combination magnetic recording and playback head positioned adjacent the guideway for contacting the magnetic tape on said stick as it moves along said path of travel to permit selective recording and playing back of messages contained thereon, and
    said switch means being located a distance from the exit of said guideway that is less than the linear length of the stick whereby the leading edge of the stick extends beyond the exit of the guideway when the drive means is deactivated.

2. The apparatus of claim 1 that further includes audio circuitry coupled to said head for selectively recording and playing back messages recorded upon said tape and means for connecting the audio circuitry to said switch means to automatically turn on said audio circuitry when the leading edge of the stick passes into said entrance to the guideway passage and to automatically turn off said audio circuitry when the trailing edge of the stick passes through the entrance.

3. The apparatus of claim 2 wherein the audio circuitry is normally in a playback mode of operation and further includes a first function switch for interrupting the drive means and a second function switch for changing the playback mode of operation to a record mode of operation.

4. The apparatus of claim 1 wherein said drive means includes a pair of opposed pinch rollers arranged adjacent the guideway downstream from said switch means for engaging opposite sides of the stick in friction driving contact to move the stick past the magnetic head at a uniform speed.

5. The apparatus of claim 4 that further includes a biasing means for urging the opposed pinch rollers toward each other.

6. The apparatus of claim 4 wherein the stick has a planar front surface upon which is mounted the recording tape and a parallel back surface and wherein said opposed pinch rollers are arranged to engage the two parallel surfaces of the stick to drive the stick along the passage.

7. The apparatus of claim 6 wherein the roller acting on the front surface of the stick is bifurcated to contact the stick on either side of the tape whereby the tape passes under the roller without contacting said roller.

8. The apparatus of claim 1 wherein the cross section of the stick complements that of the guideway passage so that the stick is only insertable into the guideway with the recording tape facing the recording head.

9. Apparatus for recording and transcribing short messages that includes
    a housing containing a linear guideway having a passage that passes through said housing,
    said housing further containing a combination speaker and microphone coupled to audio circuit means for selectively recording and playing back messages on a magnetic tape,
    a recording head connected to said circuit means that is positioned adjacent the passage in said guideway,
    a stick slidably received within said guideway passage having a flat surface containing a magnetic tape disposed along its length that is arranged to move past the recording head,
    drive means positioned adjacent the guideway passage for engaging said stick and moving it along said guideway whereby the tape is moved past the recording head,
    switch means for automatically activating the drive means when the leading edge of the stick passes into the entrance of the guideway and deactivating the drive means when the trailing edge of the stick passes through said entrance, and said switch being positioned a distance from the exit of the guideway that is less than the length of the stick whereby the leading edge of the stick extends beyond the exit when the drive means is deactivated.

10. The apparatus of claim 9 wherein said drive means includes a pair of opposed pinch rollers arranged in the guideway downstream from said switch means for engaging opposite sides of the stick in friction driving contact to move the stick past the recording head at a desired speed.

11. The apparatus of claim 10 wherein the roller acting on the front surface of the stick is bifurcated so that it contacts the stick on either side of the tape.

12. The apparatus of claim 10 that further includes a biasing means for urging the opposed rollers toward each other.

13. The apparatus of claim 9 wherein the stick is trapezoidal shaped in cross-section and complements the guideway passage whereby the stick is only insertable into the passage with the recording tape facing the recording head.

14. The apparatus of claim 9 that further includes a function switch associated with the audio circuit means for selectively placing the audio circuit means in a record or playback mode.

15. A single message recording and playback apparatus that includes a rigid multi-sided stick having one linear flat wall and at least one adjacent side wall that is non-perpendicularly hinged with said flat wall a magnetic recording tape disposed along the flat wall of the stick for recording a message, a guideway having a passage for slidably receiving said stick therein and directing the stick along a linear path of travel, said guideway passage complementing said cross sectional geometry of said stick, a drive means located along the guideway for engaging the stick and moving it along said linear path of travel, a switch means operatively connected to said drive means, said switch positioned at the entrance to the guideway passage to automatically activate the drive means as the leading edge of the stick passes the entrance, and to automatically deactivate the drive means as the trailing edge of the stick passes through the entrance, and a combination magnetic recording and playback head positioned adjacent the guideway for contacting the magnetic tape on said stick as it moves along said path of travel to permit selective recording and playing back of messages contained thereon.

16. The apparatus of claim 15 wherein said drive means includes a pair of opposed pinch rollers arranged adjacent the guideway downstream from said switch means for engaging opposite sides of the stick in friction driving contact to move the stick past the magnetic head at a uniform speed.

17. The apparatus of claim 16 wherein the stick has a planar front surface upon which is mounted the recording tape and a parallel back surface and wherein said opposed pinch rollers are arranged to engage the two parallel surfaces of the stick to drive the stick along the passage.

18. The apparatus of claim 17 wherein the roller acting on the front surface of the stick is bifurcated to contact the stick on either side of the tape whereby the tape passes under the roller without contacting said roller.

* * * * *